United States Patent [19]
Pico

[11] 3,929,391
[45] Dec. 30, 1975

[54] CONVEYOR BELT IDLER ROLLERS

[76] Inventor: Francisco A. Pico, 1212 N. El Paso St., El Paso, Tex. 79902

[22] Filed: Nov. 19, 1974

[21] Appl. No.: 525,224

[52] U.S. Cl. ............................ 308/20; 308/190
[51] Int. Cl.² ................................... F16C 35/06
[58] Field of Search ........ 308/20, 26, 28, 36.1, 190, 308/208, 237 R, 238, 188; 198/192 R, 192 A; 193/37

[56] References Cited
UNITED STATES PATENTS

| | | | |
|---|---|---|---|
| 3,011,843 | 12/1961 | Ebersole | 308/20 X |
| 3,301,612 | 1/1967 | Thomas | 308/20 |
| 3,489,468 | 1/1970 | Buck | 308/20 |

*Primary Examiner*—John J. Love
*Attorney, Agent, or Firm*—Shanley, O'Neil and Baker

[57] ABSTRACT

A support idler roller for belt conveyors which includes a hollow shaft carrying roller bearings and a concentric roll body made up of a pair of semi-cylindrical complementary sections concentrically disposed relative to the shaft and supported in spaced relation to the shaft by the roller bearing structure and an elastic sleeve member having an outer cylindrical wear surface for supporting a belt conveyor resiliently holding the two complementary sections together, the inner bearing raceway member of the roller bearing structure being rigidly affixed to the shaft and the outer bearing raceway member being frictionally received and held by the body member, the frictional resistance between the outer bearing raceway member and the body member being such as to permit the body member to turn on the outer bearing raceway member if the roller bearing should freeze.

14 Claims, 3 Drawing Figures

CONVEYOR BELT IDLER ROLLERS

BACKGROUND OF THE INVENTION

Where flexible conveyor belts are used, they are carried on idler rollers, the idler rollers normally rotating on roller bearings. As time passes the roller bearings cease functioning properly because of infiltration with dust and moisture from ore, coal, grain or whatever is being transported and resulting uneven wear of the roller elements. This results in the roller bearing structure jamming or freezing. In such case in conventional structures, the idler roller involved stops rotating and the conveyor belt is dragged over the stopped roller damaging the roller surface and the conveyor belt, or the roller turns and the roller bearing and supporting structure in the roller body is chewed up.

The present invention makes provision for the roller continuing to turn in the event that a roller bearing jams. Although not as efficient as the normal roller bearing action, the continued functioning of the roller prevents damage to the roller and to the conveyor belt.

DETAILED DESCRIPTION

Figure 1:
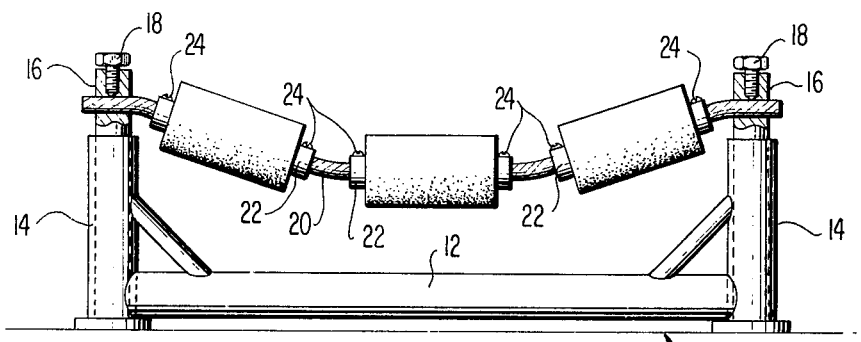
FIG. 1 is a schematic view in end elevation of a conveyor belt support frame incorporating a plurality of the conveyor belt idler rollers of the present invention as they are used to support a belt conveyor.

Referring to the drawing, FIG. 1 shows a conveyor belt supporting frame indicated generally at 10 made up of a base member 12 and two upright standards 14 of tubular configuration, each of which telescopically receives a steel cable clamp 16 carrying a set screw 18 for clamping and holding an end of a steel cable 20. Steel cable 20 is of a length which will cause it to assume a catenary form corresponding to the desired shape of the conveyor belt carrying, for example, a continuous pile of pulverant material. It will be obvious that instead of the three idler rollers shown in FIG. 1 for illustration, any number of idler rollers may be used depending upon the width of the conveyor belt. Each idler roller has a hollow shaft 22 through which the steel cable passes and each hollow shaft carries a set screw 24 at each end by means of which each hollow shaft can be rigidly fastened to cable 20.

Figure 2:
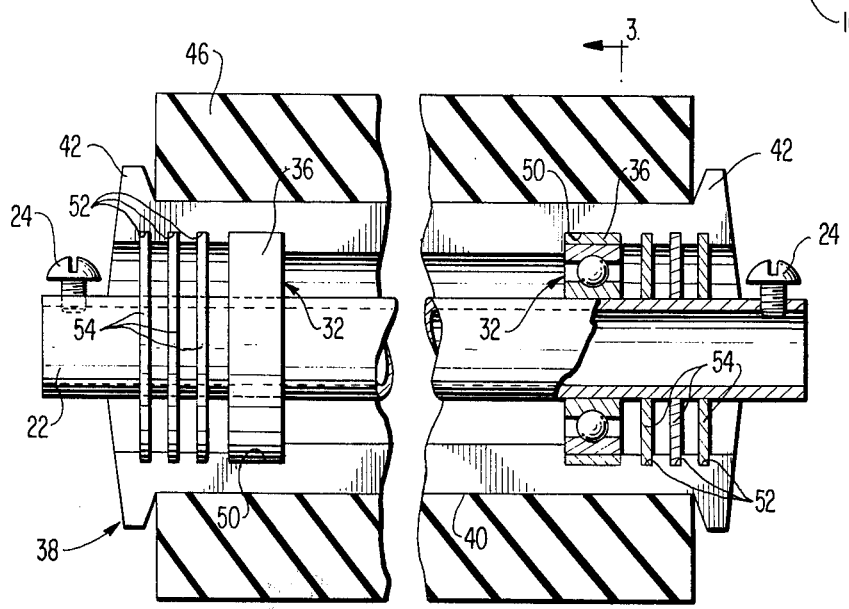
FIG. 2 is a view in cross section of an idler roller embodying the present invention taken on the line 2—2 of FIG. 3.
Figure 3:
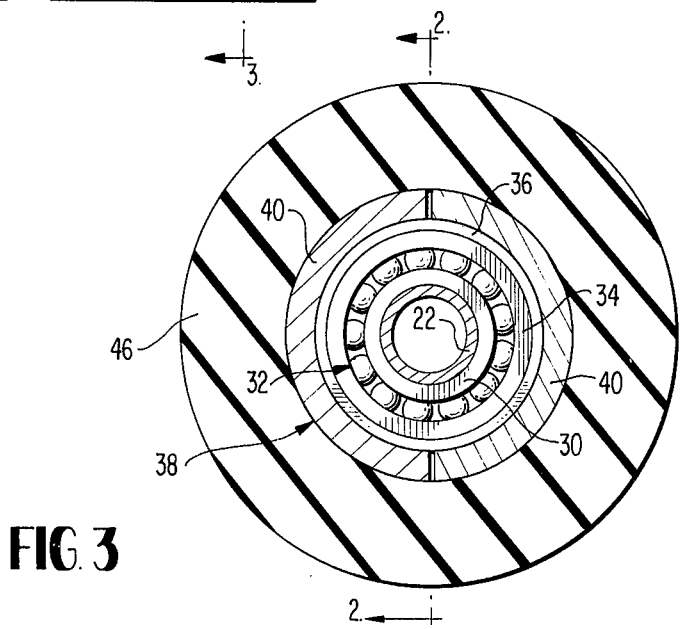
FIG. 3 is a view in cross section taken on the line 3—3 of FIG. 2.

As better shown in FIGS. 2 and 3 each idler roller has rigidly mounted on hollow shaft 22 the inner bearing raceway 30 of a roller bearing structure indicated generally by the reference numeral 32, the two roller bearing structures being symmetrically arranged along the length of hollow shaft 22. Each roller bearing structure 32 includes an outer bearing raceway 34 having an outermost smooth casing 36. Any suitable bearing elements such as ball bearings or roller bearings can be used in the bearing structure 32 and the term roller bearing is used herein to include any satisfactory form of bearing elements.

The idler roller of the present invention has a body member indicated generally at 38 made up of sections, herein shown as two identical semi-cylindrical sections 40, 40, which in the form illustrated present a body member with end flanges 42, 42 and an internal bore of varying diameter for purposes described below. The two body member sections 40, 40 are resiliently held together by an elastic sleeve 46 which presents an outer cylindrical wear surface for contact with and support of a conveyor belt, not shown. Sleeve member 46 can be of rubber and the elasticity of this sleeve member is such as to permit it to stretch and pass over flanges 42, herein shown exaggerated in size.

Referring now to the interal bore configuration of body member 38, there are shown a plurality of circular grooves or recesses concentric to the longitudinal axis of the shaft, which axis is also the sole axis of symmetry of the shaft. Each of two of the circular grooves 50, 50 is shaped to receive snugly the outer smooth casing of one of the bearing structures 32 so that the pair of bearing structures coact with the circular slots to hold body member 40 concentric to and spaced from shaft 22 and against longitudinal displacement of body member 40 relative to shaft 22. It will now be evident that body member 40 can rotate around shaft 22 on roller bearing structure 32 when the roller is assembled. Outboard of circular grooves or recesses 50, 50 are a plurality of similar but narrower circular grooves or recesses 52 which hold against longitudinal displacement relative to the shaft a plurality of grease retainers 54 which are snugly but slideably received on shaft 22 and within grooves 52.

Body member 38 can be formed of any desirable structural material but for one of the primary purposes of the present invention this body member is formed of any suitable self lubricating material, such as NYLATRON, a proprietary material, CS nylon N, a proprietary material, RULON, a proprietary material, or a wear resistant molybdenum disulfide lubricant filled material. The dimensioning of the sections 40, 40 of body member 38 and the elasticity of sleeve 46 are such that circular grooves 50, 50 snugly engage the smooth outer casing 36, 36 of bearing 32, 32 and frictionally hold body member 38 against movement relative to outer bearing raceway 34 during normal operation of the roller. However, if one of roller bearings 32 fails and, as is usually the case, the bearing jams or freezes, the self lubricating characteristics of the material of body member 38 will allow the body member to rotate on the smooth casing 36 of the outer bearing raceway member.

Where body member 40 is formed of any desirable structural material other than a self lubricating material, inserts of self lubricating material can be used to line recesses 50 whereby the same result is accomplished at those points as where the entire body member 40 is formed of self lubricating material.

The elasticity of sleeve member 46 is such as to hold the encompassed parts of the roller firmly together but not to exert so great a pressure on juxtaposed surfaces at 36 and 50 as to prevent relative movement of these surfaces or too great a frictional force between them. Additionally, the resilient or elastic nature of sleeve member 46 permits the encompassed parts of the roller to expand thermally due to friction at surfaces 36 and 50 when a roller bearing fails.

The roller of the present invention is so designed that it can be assembled by unskilled labor. It requires only the correct positioning of the roller bearings 32 and grease seals 54 in relation to the complementary semi-cylindrical sections 40, 40 of the body, the elastic sleeve 46 being then forced over one end flange 42 of the body by means of a pneumatic or hydraulic tool to thereby complete assembly of the idler. Thus the design of the roller makes possible a low production cost.

It is possible with the present invention to continue normal idler rotation for several years after the roller bearing fails, even after failure of the grease and dust seals, because of the great abrasion resistance and low friction properties of the self-lubricating material engaging casings 36, 36. Therefore, this invention doubles the normal life of conveyor belt idler rollers and completely eliminates damage to a conveyor belt by jammed or frozen roller bearings.

I claim:
1. Roller structure comprising
   a. shaft means having an axis of symmetry,
   b. means for holding the shaft means against rotation relative to a mounting member,
   c. a roller body member concentrically disposed relative to the axis of symmetry of the shaft means and radially spaced outwardly from the shaft means,
   d. the roller body member comprising a plurality of separable segments extending in the direction of the axis of symmetry,
   e. inner bearing raceway means carried by the shaft means in nonrotatable relation to the shaft means,
   f. outer bearing raceway means disposed in coacting relationship to the inner bearing raceway means,
   g. roller bearing means between the inner bearing raceway means and the outer bearing raceway means,
   h. elastic sleeve means having an outer cylindrical wear surface surrounding and resiliently holding the roller body member segments in contact with the outer bearing raceway means while permitting thermal expansion of the roller parts, and
   i. means associated with the roller body member normally holding the outer bearing raceway means against rotation relative to the roller body member,
   j. the last claimed means including a relatively low coefficient of friction surface means on the roller body member in contact with the outer bearing raceway means, the friction between the relative low coefficient of friction surface means and the outer bearing raceway means during normal use of the roller being greater than the friction between the inner bearing raceway means and the outer bearing raceway means but upon abnormally high friction arising between the outer bearing raceway means and the inner bearing raceway means, rotation of the roller can continue by virtue of relative movement of the lower coefficient of friction surface means and the outer bearing raceway means.

2. The structure of claim 1 in which
   k. the separable segments of limitation (d) comprise a pair of complementary, semi-cylindrical segments.

3. The structure of claim 2 in which
   l. the friction surface means of limitation (j) comprise a self lubricating material at least in the vicinity of the roller body member in contact with each outer bearing raceway means.

4. The structure of claim 3 in which
   m. there are a plurality of the bearing means defined in limitations (e), (f) and (g) longitudinally spaced along the hollow shaft means.

5. The structure of claim 4 in which
   n. elastic sleeve means of limitation (h) is formed of rubber.

6. The structure of claim 1 in which
   k. the friction surface means of limitation (j) comprise a self lubricating material at least in the vicinity of the roller body member in contact with each outer bearing raceway means.

7. The structure of claim 6 in which
   l. there are a plurality of the bearing means defined in limitations (e), (f) and (g) longitudinally spaced along the hollow shaft means.

8. The structure of claim 7 in which
   m. elastic sleeve means of limitation (h) is formed of rubber.

9. The structure of claim 1 in which
   k. there are a plurality of the bearing means defined in limitations (e), (f) and (g) longitudinally spaced along the hollow shaft means.

10. The structure of claim 9 in which
    l. elastic sleeve means of limitation (h) is formed of rubber.

11. The structure of claim 1 in which
    k. elastic sleeve means of limitation (h) is formed of rubber.

12. The structure of claim 2 in which
    l. there are a plurality of the bearing means defined in limitations (e), (f) and (g) longitudinally spaced along the hollow shaft means.

13. The structure of claim 12 in which
    m. elastic sleeve means of limitation (h) is formed of rubber.

14. The strucutre of claim 2 in which
    l. elastic sleeve means of limitation (h) is formed of rubber.

* * * * *